Figures 1, 2:
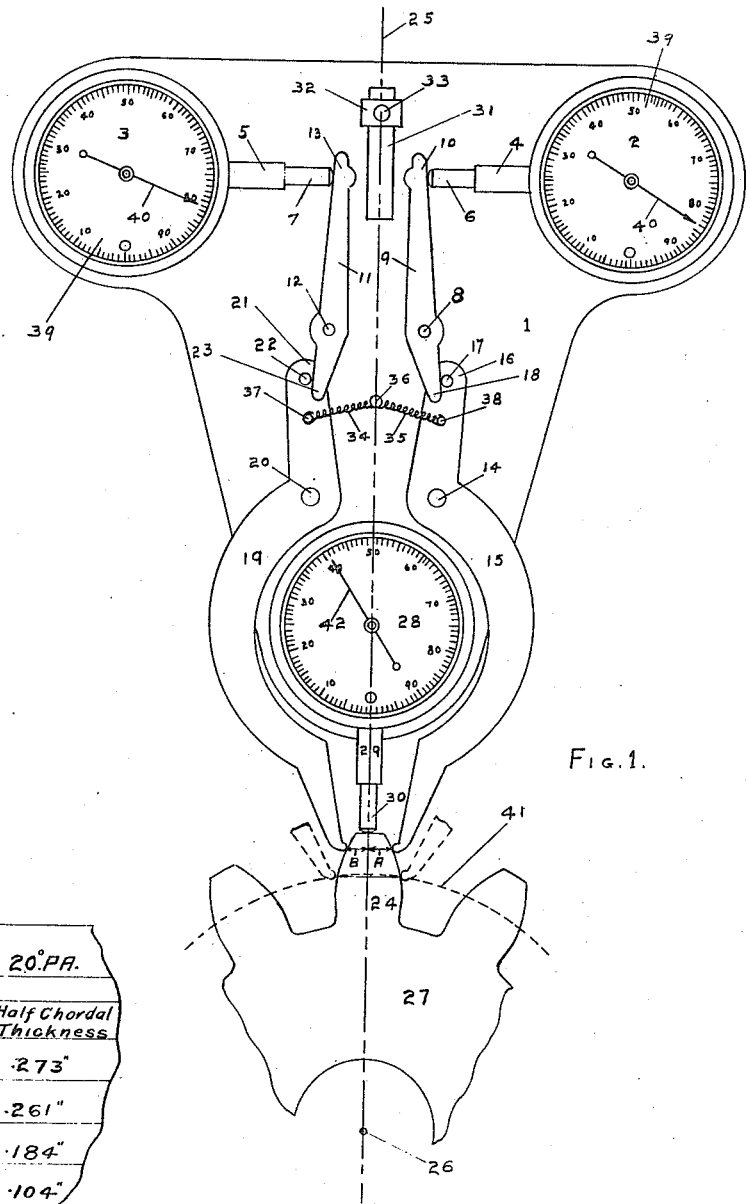

J. H. BARNES.
CURVE MEASURING DEVICE.
APPLICATION FILED MAY 25, 1915.

1,175,401.

Patented Mar. 14, 1916.

| Pinion— 12 Teeth. 3 DP. 20° PA. | | |
|---|---|---|
| Radius | Depression | Half Chordal Thickness |
| Base 1.879" | .474" | .273" |
| Pitch 2.000" | .350" | .261" |
| 2.200" | .141" | .184" |
| Addendum 2.333" | .002" | .104" |

Witnesses
Byford L. Horn
Walter Snyder

Inventor
James H. Barnes,
By Howard D. Smith,
His Attorney

UNITED STATES PATENT OFFICE.

JAMES H. BARNES, OF DAYTON, OHIO.

CURVE-MEASURING DEVICE.

1,175,401.  Specification of Letters Patent.  Patented Mar. 14, 1916.

Application filed May 25, 1915. Serial No. 30,270.

*To all whom it may concern:*

Be it known that I, JAMES H. BARNES, a subject of the King of England, residing at Dayton, in the county of Montgomery and State of Ohio, have invented certain new and useful Improvements in Curve-Measuring Devices, of which the following is a specification.

This invention relates to new and useful improvements in curve measuring devices.

The object of the invention is to provide a simple and accurate device for measuring curve outlines.

It is principally designed for the purpose of measuring the teeth of gears, but is equally efficient as a simple and accurate indicator of the exact dimensions of cams, cutters, chords and kindred elements.

The preferred form of embodiment of my invention is illustrated in the accompanying drawings, of which—

Figure 1 is a plan view of my improved curve measuring device. Fig. 2 is a view of a portion of a sheet containing data in connection with which the device is used.

Throughout the specification and drawings, similar reference characters denote corresponding parts.

In a detailed description of the preferred form of embodiment of my invention, the numeral 1 designates a supporting member preferably constructed of steel. Preferably secured to the upper right and left hand corners of the supporting member 1, are indicators 2 and 3 respectively. These indicators are preferably of the usual dial type, the indicator 2 being provided with a laterally disposed sleeve 4 which extends inwardly toward a similar sleeve 5 projecting horizontally from the indicator 3. These sleeves 4 and 5 receive operating plungers 6 and 7 respectively, which are provided for a purpose now to be described.

Operating on a pivot 8 suitably attached to the supporting member 1, is a lever 9 whose upper end 10 is in a position to engage the plunger 6. A similar lever 11 operates on a pivot 12 suitably attached to the supporting member 1, at a point opposite the pivot 8. This lever 11 has an upper end 13 in a position to engage the plunger 7.

Adapted to turn on a pivot 14 suitably secured to the supporting member 1, is a caliper lever 15. Fixed in the upper end 16 of the lever 15 is a pin 17 adapted to engage the lower end 18 of the lever 9. A similar caliper lever 19 is adapted to turn on a pivot 20 opposite the pivot 14 on the supporting member 1. To the upper end 21 of the last named lever is secured a pin 22 adapted to be engaged by the lower end 23 of the lever 11.

In Fig. 1, the lower ends of the caliper levers 15 and 19 are shown in contact with the curved face of a gear tooth 24, at points intermediate its top central point and the union of the addendum with the pitch line. When the lower ends of said caliper levers are so placed on the tooth, the instrument will be in its correct measuring position, as in such position its center line 25 coincides with the axis 26 of the gear 27. Mounted on the supporting member 1, between the caliper levers 15 and 19, is an indicator 28 whose line of action coincides with the center line 25. This indicator is preferably similar to the indicators 2 and 3, and has a downwardly extending sleeve 29 whose longitudinal axis coincides with said center line. Vertically movable within the sleeve 29 is a plunger 30 for operating the indicator 28. The natural position of the end of the plunger 30 is in the horizontal plane of the lower ends of the caliper levers 15 and 19. As shown in Fig. 1, the lower end of the plunger 30 is in contact with the circular portion of the tooth 24, by which it has been depressed a distance equal to that between the top of the tooth and the points at which the lower ends of the levers 15 and 19 are in contact with said tooth. Formed in the upper central portion of the supporting member 1, midway between the upper ends 10 and 13 of the levers 9 and 11 respectively, is a longitudinal slot 31 adapted to receive a plug 32 which may be readily moved throughout the length of said slot by a finger pin 33. This plug and slot construction is provided for a purpose to be hereinafter described. For the purpose of maintaining the pins 17 and 22 on the caliper levers 15 and 19 respectively, in contact with the lower ends of the levers 9 and 11 at all times, coil springs 34 and 35 are provided. The confronting ends of these springs are connected to a common screw 36 secured to the supporting member 1 on the center line 25, the outer end of the spring 34 being attached to a screw 37 on the upper end 21 of the lever 19, while the opposite end of the spring 35 is attached to a screw 38 on the upper end 16 of the caliper lever 15.

The operation of my improved curve measuring device will best be understood after clearly defining its purpose. The specific object of the instrument is to measure accurately, half chordal thicknesses from the center line of an irregular curve. In Fig. 1, the instrument is being employed to measure the half chordal thicknesses of the tooth 24 with respect to the center line 25.
It is well known that there are devices which will measure chordal thicknesses, but in my opinion not with the same facility, and accuracy with respect to the center line, as does my own. As before stated, in Fig. 1 the lower ends of the caliper levers 15 and 19 are shown in contact with the face curve of the tooth 24 at points intermediate the pitch and addendum lines. Accordingly, it is desired to measure the half chordal thickness A, and the half chordal thickness B of the tooth 24.

Before the instrument is mounted to take the measurements above specified, the lower or measuring ends of the caliper levers 15 and 19 are centrally set by the plug 32, which is moved through the slot 31 to a position where it will be engaged by the ends 10 and 13 of the levers 9 and 11 respectively. When so engaged, the movable dials 39 on the indicators 2 and 3 are turned to bring their zero positions opposite the pointers 40. While the plug 32 is illustrated in Fig. 1 as being in a position to be moved between the levers 9 and 11, it may be positioned between the lower ends of the caliper levers 15 and 19, or in any other suitable place to make the above adjustment. The initial position of the lower ends of the caliper levers 15 and 19 when the curve of the tooth 24 or any other, is to be measured, is that shown in Fig. 1. In other words, the lower ends of said levers are first placed in contact with said curve on the pitch line 41 when the chordal distances on the latter are bisected by the center line 25. When the lower ends of said levers are in such positions, the readings on the indicators 2 and 3 will be identical. The instrument or gear is now moved to bring the lower ends of the levers 15 and 19 at those points where it is desired to measure the half chordal thicknesses of the tooth 24, said points in Fig. 1 being intermediate the pitch and addendum lines. In moving the device from the dotted to the full line position shown in Fig. 1, care should be taken to see that the center line 25 occupies the same position relative to the tooth to be measured and the device, as it occupied when the lower ends of the caliper levers 15 and 19 were in their dotted positions. During this adjustment, the plunger 30 will be depressed by the top of the tooth 24 to cause the pointer 42 to register the degree of depression on the indicator 28. After the depression reading is taken from the indicator 28, which in this instance is .141″, readings are taken on the indicators 2 and 3. It will be observed from Fig. 1, that the reading on the indicator 2 is .184″, and on the indicator 3, .181″. In arriving at the above readings on the said indicators, it must be understood that the pointer in each instance has been given one complete revolution, designated ".1" in each reading, and an additional movement of ".041" on the indicator 28, ".084" on the indicator 2 and ".081" on the indicator 3.

The correct half chordal thicknesses for given depressions of the plunger 30, representing varying radii, are calculated, and may be tabulated as shown in Fig. 2. Referring to said figure, it will be observed that for a depression of .141″, which represents a radius of 2.200, the correct half chordal thicknesses are as follows: that of A, .184″, and that of B, .184″. By comparison we notice that the reading of the right hand indicator 2 is correct for the half chordal thickness A, but that the reading on the indicator 3 shows that there is an error of .003″ in the half chordal thickness B. It will thus be seen how valuable my instrument is in detecting the slightest error in chordal thicknesses.

I do not wish to be limited to the details of construction and arrangement herein shown and described, and any changes or modifications may be made therein within the scope of the subjoined claims.

Having described my invention, I claim:
1. A curve measuring device comprising a supporting member, an indicator mounted thereon, a member for operating the same, adapted to be depressed by the object to be measured, a device in contact with the periphery of the object to be measured on either side of said operating member, and adapted to be moved laterally by said object when said operating member is depressed, and indicating means in operative connection with said device for indicating the lateral movement thereof for a given depression of said operating member, as represented on its indicator, when the center line of the curve-measuring device is in registry with the axis of the object to be measured, substantially as described.

2. A curve measuring device comprising a supporting member, an indicator mounted thereon, an operating element therefor, adapted to be depressed by the top of the object to be measured, a lever having its lower end in contact with the periphery of the object to be measured on either side of said operating element, and adapted to be moved laterally by said object when said operating element is depressed, and an indicator in operative connection with said lever for indicating the lateral movement thereof for a given depression of said operating element, as represented on its indicator, when the center line of the curve-measuring device is in registry with the axis of the object to be measured.

3. A curve measuring device comprising a supporting member, a central indicator mounted thereon, an operating plunger therefor, adapted to be depressed by the top of the object to be measured, a pair of levers pivoted to said supporting member, the lower ends of said levers in contact with the periphery of the object to be measured on either side of said plunger, and adapted to be moved laterally by said object when said plunger is depressed, and an indicator in operative connection with each one of said levers for indicating the lateral movement thereof for a given depression on said plunger, as represented on the latter's indicator, when the center line of the curve-measuring device is in registry with the axis of the object to be measured, substantially as described.

In testimony whereof I have hereunto set my hand this 22nd day of May, 1915.

JAMES H. BARNES.

Witnesses:
WALTER V. SNYDER,
HOWARD S. SMITH.